United States Patent
Amir et al.

(10) Patent No.: US 11,574,183 B2
(45) Date of Patent: *Feb. 7, 2023

(54) EFFICIENT GENERATION OF STOCHASTIC SPIKE PATTERNS IN CORE-BASED NEUROMORPHIC SYSTEMS

(71) Applicant: INTERNATIONAL BUSINESS MACHINES CORPORATION, Armonk, NY (US)

(72) Inventors: Arnon Amir, San Jose, CA (US); Antonio J. Jimeno Yepes, Victoria (AU); Jianbin Tang, Victoria (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 667 days.

This patent is subject to a terminal disclaimer.

(21) Appl. No.: 16/539,689

(22) Filed: Aug. 13, 2019

(65) Prior Publication Data

US 2019/0370654 A1     Dec. 5, 2019

Related U.S. Application Data

(63) Continuation of application No. 14/994,940, filed on Jan. 13, 2016, now Pat. No. 10,423,879.

(51) Int. Cl.
*G06N 3/08* (2006.01)
*G06N 3/04* (2006.01)
*G06N 3/063* (2006.01)

(52) U.S. Cl.
CPC .............. *G06N 3/08* (2013.01); *G06N 3/049* (2013.01); *G06N 3/0454* (2013.01);
(Continued)

(58) Field of Classification Search
CPC ....................................................... G06N 3/08
See application file for complete search history.

(56) References Cited

U.S. PATENT DOCUMENTS

| 5,420,787 A | 5/1995 | Gawne et al. |
| 9,373,058 B2 | 6/2016 | Andreopoulos et al. |

(Continued)

FOREIGN PATENT DOCUMENTS

| CN | 101860357 A | 10/2010 |
| CN | 103814387 A | 5/2014 |

(Continued)

OTHER PUBLICATIONS

Kavehei, Omid, "Highly Scalable Neuromorphic Hardware with 1-bit Stochastic nano-Synapses," (Oct. 2013) Omid Kavehei and Efstratios Skafidas Centre for Neural Engineering, The University of Melbourne, Australia.

(Continued)

*Primary Examiner* — Li Wu Chang
(74) *Attorney, Agent, or Firm* — Erik A. Huestis; Stephen J. Kenny; Foley Hoag, LLP

(57) ABSTRACT

Weighted population code in neuromorphic systems is provided. According to an embodiment, a plurality of input values is received. For each of the plurality of values, a plurality of spikes is generated. Each of the plurality of spikes has an associated weight. A consumption time is determined for each of the plurality of spikes. Each of the plurality of spikes is sent for consumption at its consumption time.

20 Claims, 9 Drawing Sheets

(52) U.S. Cl.
CPC .......... *G06N 3/0472* (2013.01); *G06N 3/063* (2013.01); *G06N 3/0635* (2013.01)

(56) References Cited

U.S. PATENT DOCUMENTS

| | | |
|---|---|---|
| 2013/0046716 A1 | 2/2013 | Chan et al. |
| 2013/0325768 A1 | 12/2013 | Sinyavskiy et al. |
| 2014/0114893 A1 | 4/2014 | Arthur et al. |
| 2014/0156574 A1 | 6/2014 | Piekniewski et al. |
| 2015/0046383 A1* | 2/2015 | Hunzinger ............. G06N 3/049 706/25 |
| 2015/0242744 A1 | 8/2015 | Wegrzyn et al. |
| 2015/0254551 A1 | 9/2015 | Rivera et al. |
| 2015/0310303 A1 | 10/2015 | Andreopoulos et al. |
| 2015/0347870 A1 | 12/2015 | Andreopoulos et al. |
| 2016/0210552 A1 | 7/2016 | Kasabov et al. |
| 2016/0247062 A1 | 8/2016 | Amir et al. |
| 2016/0358075 A1* | 12/2016 | Zhang .................... G06N 3/063 |

FOREIGN PATENT DOCUMENTS

| | | |
|---|---|---|
| WO | 2009/113993 A1 | 9/2009 |
| WO | 2015030606 A2 | 3/2015 |
| WO | 2015/112718 A1 | 7/2015 |

OTHER PUBLICATIONS

Search Report issued by Intellectual Property Office in corresponding Application No. GB 1700228.8, dated Jul. 7, 2017.
Wu et al., "Homogeneous Spiking Neuromorphic System for Real-World Pattern Recognition," IEEE Journal on Emerging and Selected Topics in Circuits and Systems, 5(2):254-266 (2015).
Yepes et al., "Weighted Population Code for low power neuromorphic image classification," IEEE, pp. 4294-4301 (2016).
Kretzberg., "Computational Neuroscience 1. Neuronale Kodierung," Master-Grundmodul 2009: 33 pages (2009).
Search Report issued by Intellectual Propert Office in corresponding Application No. DE 102016125131.3 dated Oct. 15,2020.

* cited by examiner

EFFICIENT GENERATION OF STOCHASTIC SPIKE PATTERNS IN CORE-BASED NEUROMORPHIC SYSTEMS

CROSS-REFERENCE TO RELATED APPLICATION

This application is a continuation of U.S. patent application Ser. No. 14/994,940, filed on Jan. 13, 2016, which is hereby incorporated by reference in its entirety.

BACKGROUND

Embodiments of the present invention relate to efficient generation of stochastic spike patterns in core-based neuromorphic systems, and more specifically, to the use of weighted population code neuromorphic systems.

BRIEF SUMMARY

According to an embodiment of the present invention, a method of and computer program product for generation of stochastic spike patterns are provided. A plurality of input values is received. For each of the plurality of values, a plurality of spikes is generated. Each of the plurality of spikes has an associated weight. A consumption time is determined for each of the plurality of spikes. Each of the plurality of spikes is sent for consumption at its consumption time.

According to another embodiment of the present invention, a method of and computer program product for generation of stochastic spike patterns are provided. A first plurality of spikes is received at a first neuromorphic system. The first plurality of spikes encodes a first value according to a first encoding. A second plurality of spikes is generated from the first plurality of spikes. The second plurality of spikes encodes the first value according to a second encoding. The second plurality of spikes is provided to a second neuromorphic system.

According to another embodiment of the present invention, a method of and computer program product for generation of stochastic spike patterns are provided. A first plurality of spikes is received at a neuromorphic system. The first plurality of spikes encodes a first value according to a first encoding. A plurality of sets of spikes is generated from the first plurality of spikes. Each of the plurality of sets of spikes encodes the first value according to a second encoding. Each of the plurality of sets of spikes is provided to one of a plurality of classifiers in the neuromorphic system.

According to another embodiment of the present invention, a system for generation of stochastic spike patterns are provided. A neuromorphic network is provided. The neuromorphic network includes a plurality of input axons and a plurality of stochastic neurons connected thereto. An encoder is operatively coupled to the plurality of input axons. The image encoder is configured to send to the input axons a first plurality of spikes. The first plurality of spikes encodes a first value according to a first encoding. The neuromorphic network is configured to generate from the first plurality of spikes a second plurality of spikes. The second plurality of spikes encodes the first value according to a second encoding.

DETAILED DESCRIPTION

Figure 1:
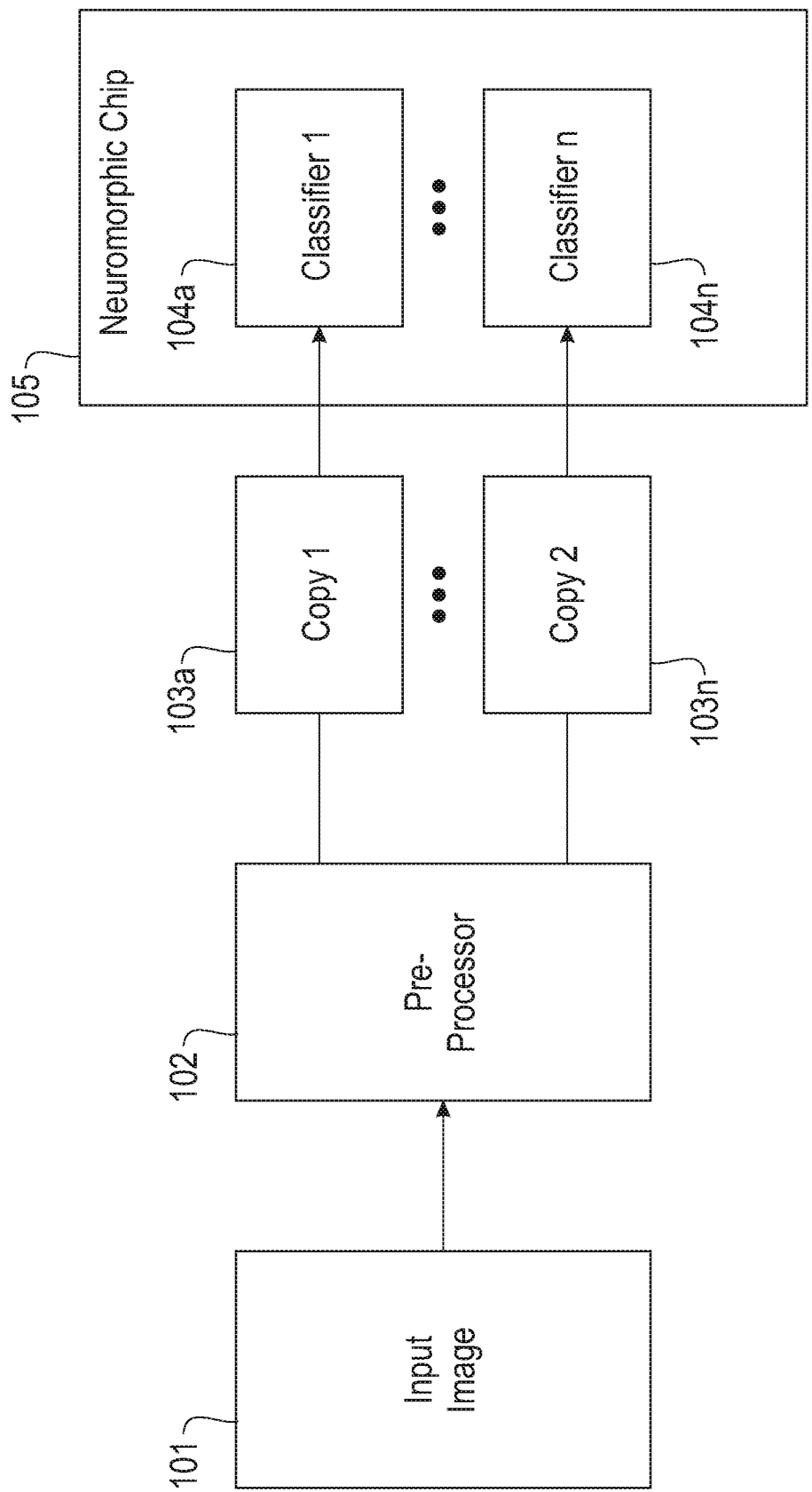
FIG. 1 depicts an exemplary ensemble classifier according to embodiments of the present disclosure.

In digital spiking neuromorphic systems, information is represented and delivered by spikes, where each spike is a digital packet of information, carrying one or more bits. For example, the IBM TrueNorth chip is a digital spiking neuromorphic system where each spike carries a single bit of information (a binary spike). Spiking neural networks such as TrueNorth are based on delivering packets of information over switched communication wires, thereby significantly reducing the required wiring. The presence of a spike is treated as receiving a 1, its absent represents a 0. More values can be coded into binary spikes using several different spike coding schemas.

Such coding schemas include rate code, time to spike, population code, and stochastic code. These coding schemas differ in the number of spikes required to represent a value, the number of required axon (input) channels, and in the duration (or time window) it takes to represent the data.

For certain types of neuromorphic computations, some coding schemas are more efficient than others. The appropriate coding schema is thus an important design feature for networks deployed on neurosynaptic architectures. Two important considerations in such systems are low power consumption and high information bandwidth. However, power and bandwidth are often subject to tradeoff.

For a system to perform its computation it has to receive input data. This input data may be produced by cameras, microphones, data files or any other sensors and information sources. This data has to first be transcoded to spikes using a spike coding schema. These spikes are then delivered to the neurosynaptic chip via communication lines. After the computation is carried on by the neurosynaptic chip the results are sent out of the neurosynaptic chip, again in the form of spikes, and are received by a circuit or a CPU that transcodes them back to values or symbolic representation. Thus, spike conversion and communication occurs on both input to and output from the neurosynaptic chip. The final representation of the output fata may depend on the type of information conveyed. For example, in various embodiments, the output may include class labels, confidence level, or action commands to actuators.

The communication bandwidth of a given neurosynaptic chip is limited by the chip characteristics and the circuit that connect to it, as well as the characteristics of the transcoding and decoding component. To achieve efficient bandwidth utilization, data is coded to fit within the bandwidth. Moreover, in general, the higher the spike rate is, the more energy it consumes. Accordingly, the present disclosure provides efficient spike coding schemas that represent information with a small number of spikes, thus reducing power consumption, and yet support efficient computation on a neurosynaptic chip.

One exemplary coding schema is stochastic coding. In stochastic coding, a real value between 0.0 and 1.0 is represented by the probability of spiking at every given tick. Another exemplary coding scheme is rate coding, in which the value is coded by the spiking rate. In rate coding, the spiking rate is presumed to be regular over time. Thus, rate coding results in nearly the same encoding as stochastic coding.

In computational neural networks, for example the IBM TrueNorth system, this representation is suitable for various classifiers including the TEA classifier and convolution network, spike arithmetics, and signal filtering. Stochastic or rate coding provides a simple mathematical model, enabling the design of complex non-linear networks. However, stochastic rate code is often inefficient. It requires a relatively large number of spikes to represent a value. For example, representing the value of 0.5 (50%) means that a spike should be sent every other tick, on average. In an exemplary system, which runs at 1000 spike-cycles (ticks) per second, this implies a high 500 Hz spiking rate per input. The dimensionality of the data, such as the number of pixels in an input frame, may be high as well—from a few thousands to millions of pixels per frame.

Multiplying the number of dimensions by the number of samples per second by the spikes per sample provides the total required bandwidth. Following the example above, a 1 megapixel image at ten frames per second using 100 ticks per frame would require 1,000,000*10*100*0.5=500 million spikes on average. While a neuromorphic chip such as IBM TrueNorth may be designed to hold high internal rates of spike traffic, the chip's input and output bandwidth are more limited, by the factors mentioned above. Accordingly, although stochastic rate coding may be desirable for computation, it is expensive in bandwidth and power consumption.

Various comparisons are provided herein to stochastic or rate coding. However, it will be appreciated that the weighted population code schemes according to the present disclosure have certain advantages over alternative coding schemes such as time-to-spike code, burst-length code, conversion between time-to-spike and burst-length code, thermometer code, and conversion between rate and burst-length code. Thermometer code in particular has the same coding efficiency as population code with respect to the number of spikes and axon lines required to code a value. Weighted population code according to the present disclosure requires fewer spikes and ticks to represent the same dynamic range compared to these alternative codes.

Another attribute that varies between spike coding schemas is how many representations there are for the same value. In thermometer code, burst-length code, and time-to-spike, each value has one unique representation or coding. However, in rate code, stochastic code, and often times in weighted population code, there may be multiple representations for the same value. Following the above example, a value of 0.5 represented in rate code within a window of 100 ticks may have numerous different codes (placing 50 spikes over 100 ticks), and even more so in stochastic code (where the probability of spiking in each tick is independent of the other ticks). The multiplicity of representations is a factor in the performance of stochastic networks.

In certain systems, the input may be provided in two or more copies. This may be the case when the network is composed of multiple classifiers, either computing different classes or the same classes (e.g., in classifier ensembles used for increased accuracy), or when the network topology requires the input to arrive on several axons for each core to support higher dynamic range in synaptic weights (requiring multiple copies, e.g., 2-4 copies in TrueNorth chips), or when the system is compose of several sub-systems, each of which requires a separate copy of the input.

Referring now to FIG. 1, an exemplary ensemble classifier is illustrated. Input image 101 is provided to pre-processor 102. Pre-processor 102 performs image pre-processing, encodes the resulting image, and outputs stochastic code. Multiple instances 103a . . . n of the stochastic code are provided to a plurality of classifiers 104a . . . n, residing in neuromorphic chip 105, which in some embodiments is a TrueNorth chip. The total input bandwidth in this example would be n times larger than in the non-ensemble, single classifier, case.

Figure 2:
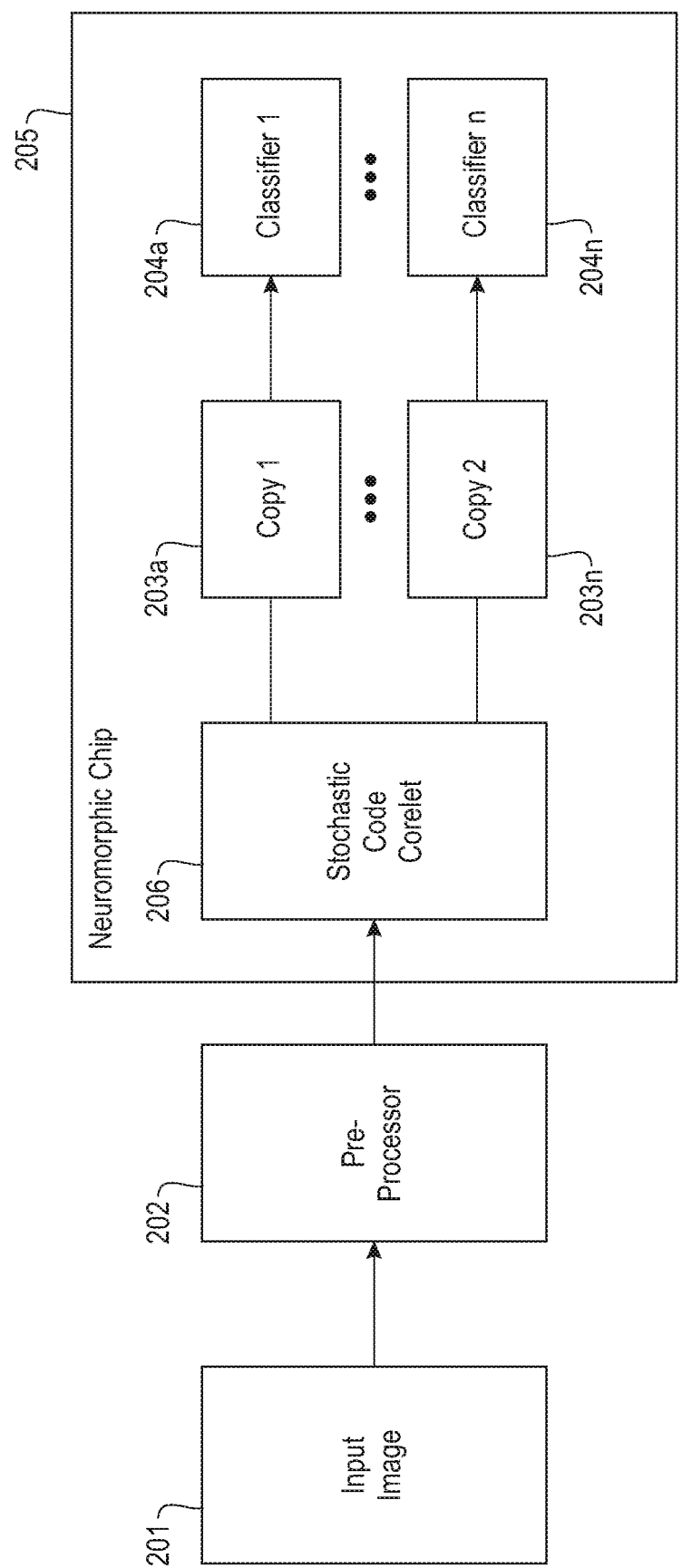
FIG. 2 depicts another ensemble classifier according to embodiments of the present disclosure.

Referring to FIG. 2, a coding scheme according to the present disclosure is illustrated. Input image 201 is provided to pre-processor 202. Pre-processor 202 performs image pre-processing, encodes the resulting image according to the weighted population code provided herein, and outputs the weighted population code. The resulting weighted population code is provided to a stochastic code corelet 206 in neuromorphic chip 205. Stochastic code corelet 206 in turn converts the weighted population code into stochastic code suitable for ingestion to a classifier. Multiple instances 203a . . . n of the stochastic code are provided by stochastic code corelet 206 to a plurality of classifiers 204a . . . n, also residing in neuromorphic chip 205, which in some embodiments is a TrueNorth chip. Each instance is an independent coding of the same input value in stochastic code.

The scheme of FIG. 2 ingests the data into the chip with a lesser number of spikes and includes an on-chip conversion network that converts it to stochastic code for efficient network computation. Accordingly, an efficient weighted population code schema for data ingestion is provided in conjunction with an on-chip conversion network that converts the weighted population code to stochastic code for efficient network computation.

An alternative for handling ensemble classifiers is to use a splitter corelet on chip. A splitter corelet copies the exact same input spikes multiple times. However, such a process creates dependency between the classifiers or sub-systems. In particular, the stochastic code is expected to be independent, identically distributed (IID). If the same code is provided to all classifiers, their results may correlate as well, which in turn reduces the classification gain from ensembles. Weighted population code according to the present disclosure consumes the same number of cores and has the advantage of generating independent, identically distributed (IID) inputs to the classifiers ensemble.

Test results of a system according to FIG. 2, implemented on a TrueNorth NS1e board, show real-time run at 1000 ticks per second while producing classification results for an image classification demo using an ensemble of 8 classifiers and a MNIST character recognition demo using an ensemble of 16 classifiers.

As described further below with regard to various embodiments, for a given task with a given dynamic range and time window, the weights of the weighted population code are optimized to minimize the expected number of spikes (input bandwidth). In some embodiments, the input bandwidth does not change when the number of classifiers in the ensemble grows. Input bandwidth is thus independent of how many copies of the input data are required by the system.

In some embodiments, the input weighted population code bandwidth is independent of the total duration of the stochastic code output from the conversion network. In general, the longer this output is, the more accurate the classification results would be. By making the input number of spikes constant per frame, a larger time window actually reduces the required average bandwidth in the input—another important advantage over prior work.

In some embodiments, the input spikes are ingested while the network is still generating stochastic code output spikes from the previous frame. The transition to the next frame can be made over a minimal number of ticks, for example 1-3. This reduces the setup time between frames and increases the temporal chip utilization.

A weighted population code according to the present disclosure is a spike coding schema where a value x in a dynamic range D is represented by Equation 1, where k is the number of axonal input lines, $w_i$ is the weight associated with the ith axonal input, and $S_i(t)$ is the ith input spikes sequence over a time window of n ticks.

$$x = \sum_{\substack{i=1\ldots k \\ t=1\ldots n}} S_i(t) w_i \qquad \text{Equation 1}$$

For example, let k=3, w=[1,3,9] and n=2. The values of x can be represented by a number of spikes as illustrated in Table 1.

TABLE 1

|   | Tick 1 | | | Tick 2 | | |
|---|---|---|---|---|---|---|
| x | $s_1 = 1$ | $s_2 = 3$ | $s_3 = 9$ | $s_1 = 1$ | $s_2 = 3$ | $s_3 = 9$ |
| 0 | | | | | | |
| 1 | 1 | | | | | |
| 2 | 1 | | | 1 | | |
| 3 | | 1 | | | | |
| 4 | 1 | 1 | | | | |
| 5 | 1 | 1 | | 1 | | |
| 6 | | 1 | | | 1 | |
| 7 | 1 | 1 | | | 1 | |
| 8 | 1 | 1 | | 1 | 1 | |
| 9 | | | 1 | | | |
| 10 | 1 | | 1 | | | |
| 11 | 1 | | 1 | 1 | | |
| 12 | | 1 | 1 | | | |
| 13 | 1 | 1 | 1 | | | |
| 14 | 1 | 1 | 1 | 1 | | |
| 15 | | 1 | 1 | | 1 | |
| 16 | 1 | 1 | 1 | | 1 | |
| 17 | 1 | 1 | 1 | 1 | 1 | |
| 18 | | | 1 | | | 1 |
| 19 | 1 | | 1 | | | 1 |
| 20 | 1 | | 1 | 1 | | 1 |
| 21 | | 1 | 1 | | | 1 |
| 22 | 1 | 1 | 1 | | | 1 |
| 23 | 1 | 1 | 1 | 1 | | 1 |
| 24 | | 1 | 1 | | 1 | 1 |
| 25 | 1 | 1 | 1 | | 1 | 1 |
| 26 | 1 | 1 | 1 | 1 | 1 | 1 |

For example, the value of x=14 is represented by sending two spikes to the first axon (weight $s_1=1$), one spike to the second axon ($s_2=3$) and one spike to the third axon (weight $s_3=9$). Hence, 1+1+3+9=14 is represented by 4 spikes. In general, the input range can be extended by adding more axons with equal or different weights, and by extending the time window to more ticks (larger n). The combination of both constitutes the input range.

The maximum value of x is given by Equation 2.

$$x_{max} = n \sum_{i=1\ldots k} w_i \qquad \text{Equation 2}$$

A weighted population code according to the present disclosure represents an integer value. In order to use it to transduce stochastic code, the integer value has to be used to code a probability between 0.0 and 1.0. The dynamic range D is defined as a number between 1 and $x_{max}$, for example D=16. The resulted stochastic code is then defined as y=x/D. Probabilities are quantized to D values. When D is not the highest value that can be represented by x, as in the above example, x values higher than D are omitted. The resulted stochastic code y is given in Table 2.

TABLE 2

|   | Tick 1 | | | Tick 2 | | | |
|---|---|---|---|---|---|---|---|
| x | $s_1 = 1$ | $s_2 = 3$ | $s_3 = 9$ | $s_1 = 1$ | $s_2 = 3$ | $s_3 = 9$ | y (D = 16) |
| 0 | | | | | | | 0.000 |
| 1 | 1 | | | | | | 0.063 |
| 2 | 1 | | | | 1 | | 0.125 |
| 3 | | 1 | | | | | 0.188 |
| 4 | 1 | 1 | | | | | 0.250 |
| 5 | 1 | 1 | | 1 | | | 0.313 |
| 6 | | 1 | | | 1 | | 0.375 |
| 7 | 1 | 1 | | | 1 | | 0.438 |
| 8 | 1 | 1 | | 1 | 1 | | 0.500 |
| 9 | | | 1 | | | | 0.563 |
| 10 | 1 | | 1 | | | | 0.625 |
| 11 | 1 | | 1 | 1 | | | 0.688 |
| 12 | | 1 | 1 | | | | 0.750 |
| 13 | 1 | 1 | 1 | | | | 0.813 |
| 14 | 1 | 1 | 1 | 1 | | | 0.875 |
| 15 | | 1 | 1 | | 1 | | 0.938 |
| 16 | 1 | 1 | 1 | | 1 | | 1.000 |

The dynamic range of the resulted stochastic code D has to be same or smaller than of the input range. Otherwise, there will be high probability values which cannot be represented by spikes in the input x. Hence, $D \leq x_{max}$.

Figure 3:
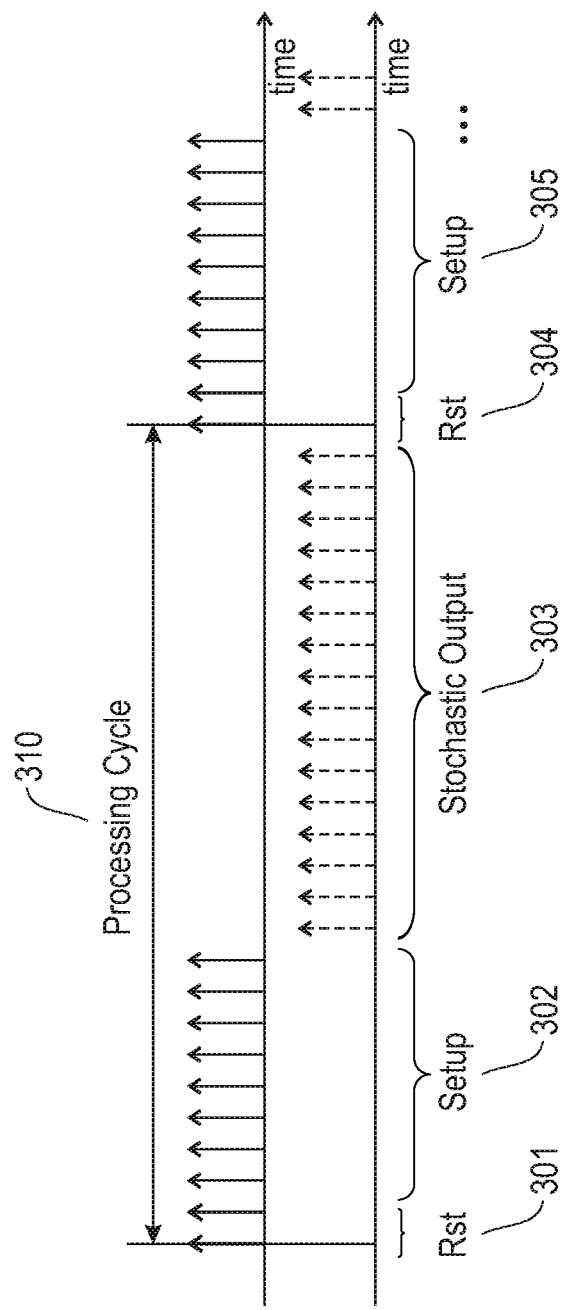
FIG. 3 illustrates an exemplary system processing cycle according to embodiments of the present disclosure.

Referring now to FIG. 3, an exemplary system processing cycle according to the present disclosure is illustrated. A reset is performed during reset period 301. In some embodiments, the reset function is implemented using spikes sent to axons with high negative weights, thereby reducing the neuron potential. Several spikes may be needed to ensure the complete reset of the neuron potential to zero. Accordingly, multiple ticks may be included in reset period 301, for example, 2 as pictured.

Weighted population spikes are sent during setup period 302. Within this period, the neurons build up their membrane potential to the value indicated by the input data. During stochastic output period 303, the neurons spike stochastically according to their spiking probabilities. This period is generally determined by the classifier or the other systems fed by the output of the stochastic coding system.

Taken together, reset period 301, setup period 302, and stochastic output period 303 form single processing cycle 310, which covers the combined time taken to process an input frame. Additional processing cycles may follow, comprising further reset period 304, setup periods 305, etc.

The ratio between the stochastic output time 303 and the sum of the reset setup times 301, 302 is the system's duty cycle. In general, it may be desired to maximize the duty cycle because the reset and setup times are non-productive (the classifier having no input). As pictured, the exemplary duty cycle of FIG. 3 is 16:10.

In the above example, the average spikes per value (for values 0:15) is 2.25, using just three input lines and three weights. While it is higher than the natural 4-bit binary representation, averaging 2.0 spikes per value, it saves an axon and a weight in the hardware-implemented Axon-type lookup table. Accordingly, this coding has great benefits for spike based representations.

The input spike rate is defined as the average spikes per tick at the input to the system. In some embodiments of an underlying neuromorphic system, the maximum input spike rate may be bounded by practical system characteristics. Thus, the tick in which the largest number of spikes has been sent into the system is a characteristic of interest.

In another exemplary embodiment, a weighted population code is provided using 5 axons with w=[1,1,3,3,9]. In this embodiment, the composition of a value of 14 may remain the same, i.e., 1+1+3+9=14. However, the coding fits into a single tick instead of two. When the number of axons available is larger, it allows less time to be used to setup the neuron to the desired membrane potential, or to increase the dynamic range (accuracy). When the number of stochastic outputs per pixel is large, more axons may be used without increasing the number of cores in the system or incurring any additional cost.

As noted above, system processing time is an important design criteria. In general, process the data as fast as possible using the least resources (e.g., power, cores) is desirable. In some embodiments, the processing cycle is reduced by decreasing the time it takes to setup the neurons to the desired membrane potential by reducing the number of ticks designated to setup. This would increase the system's duty cycle. However, this also implies that all the weighted-population code spikes need to be sent over a shorter period of time, thereby increasing the communication bandwidth during that period.

In some embodiments, a neuron membrane potential is not set to zero between setup periods. Accordingly, the reset period is omitted. To set a new value, the, a differential coding is used. The encoded value in a subsequent setup period 305, is the difference between the value of the input 302 in the previous frame and the new input. By adding this difference to the current membrane potential, it will change to the new value. In such embodiments, at least one of the weights in the population code is negative.

Figure 4:
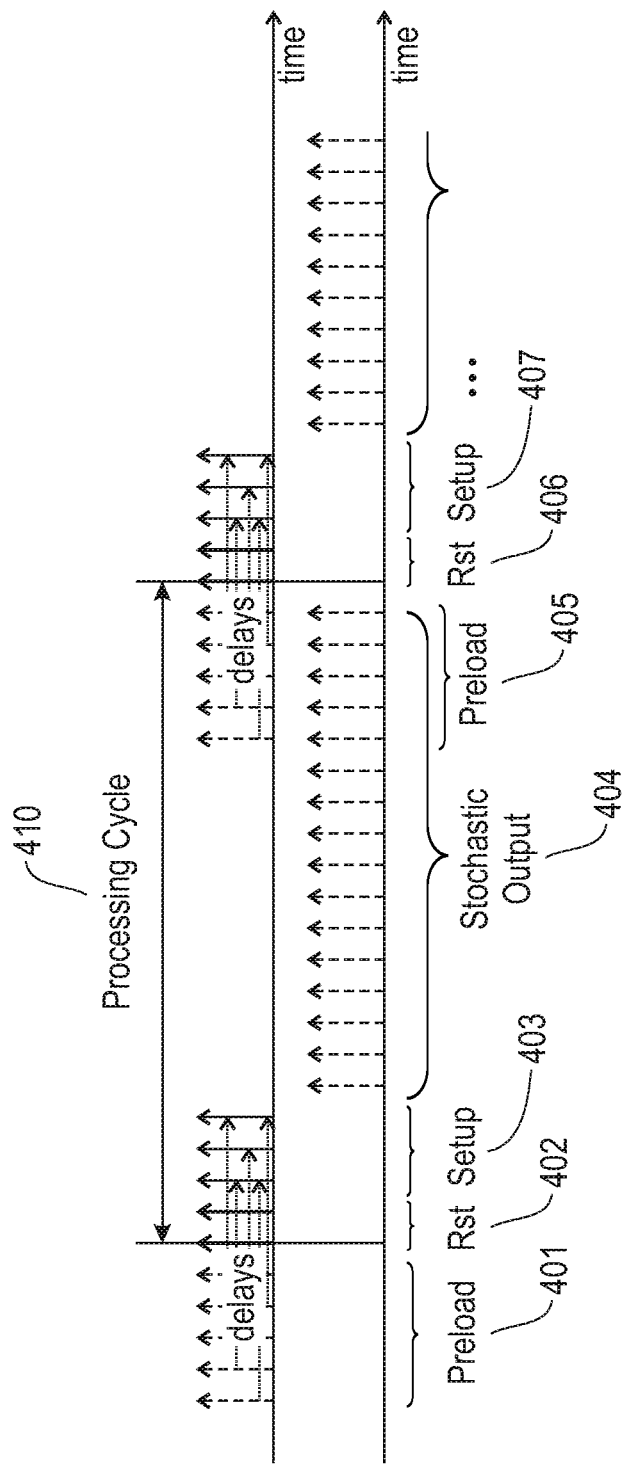
FIG. 4 illustrates another exemplary system processing cycle according to embodiments of the present disclosure.

Referring now to FIG. 4, methods according to the present disclosure for overcoming the increased maximum input spike rate are illustrated. In some embodiments, some of the spikes are sent ahead of time over a longer time window with a delay such that each spike's consumption by the neuron is within the setup time window.

During preload period 401, the spikes are sent with a delay. The preload period overlaps the time of the prior stochastic output. After reset period 402, the spikes affect the neuron during setup period 403. In this manner, setup period 403 is reduced from eight ticks to three. During stochastic output 404, a subsequent preload 405 is performed, leading in turn to reset and setup periods 406, 407.

It will be appreciated from the above that the weighted population code scheme according to the present disclosure can be viewed in terms of two subcomponents. One component comprises a network that receives an input in weighted population code and generates output spikes in stochastic code. This network is configurable, can be used with any set of weights and any number of output copies per each input pin. The other component comprises a transducer for weighted population code that converts input integer data to a sequence of spikes in weighted population code.

In some embodiments, weighted population code according to the present disclosure is implemented as a corelet. The corelet generates a stochastic rate code given an input value for each information unit (e.g., a pixel or probability) with values from 0 to 1. The corelet creates one or more copies of the input information units. In some embodiments, each copy of the stochastic rate code is generated using a TrueNorth neuron with stochastic threshold set according to the input probability.

In an exemplary embodiments, the corelet is used to transduce an image in stochastic code to a Tea classifier corelet. As noted above with regard to FIG. 1, one approach is to create multiple copies of an image in stochastic rate code using a pre-processor such as a tn-signal-processor tool. These copies are then transmitted to the chip to feed an ensemble of Tea classifiers. Since these copies are sent to the chip at the same time, the input bandwidth to the chip is multiplied and may be saturated. Bandwidth consumption is particularly significant when larger images with more channels are used.

As discussed above with regard to FIG. 2, use of a stochastic code corelet according to embodiments of the present disclosure reduces the bandwidth to that of only a single copy of the data. The transduction into the stochastic code corelet is performed using weighted population code. This code is transduced once, over a number of ticks (during the setup period illustrated in FIGS. 3-4). After this setup, the corelet produces stochastic code output until it receives a reset spike. During that time, no input is required at all. Hence, the average input bandwidth is the input provided during the setup period divided by the sum of the setup time and the stochastic output time. The longer the output period, the lower the average input rate. This is in contrast to external stochastic code transduction, which must be active for the entire duration of the output window. Accordingly, the corelet reduces the average input spike rate, especially in cases where the output window is long.

A corelet according to embodiments of the present disclosure uses neurons with stochastic threshold in Pure Integrator mode (gamma=2) to generate spikes. The operation goes in cycles composed of three stages, namely reset, setup and generate, as illustrated in FIGS. 3-4. In some embodiments, the reset stage is one or two ticks long, during which the membrane potential of the stochastic neurons is set to zero. The setup stage is when the input spikes are integrated to the neurons, building the membrane potential to a level which corresponds to the probability of the stochastic code. During this stage, which in some embodiments lasts for one to three ticks, the neuron may start spiking as the membrane potential passes the neuron threshold (alpha), however the output rate might not yet match the input probability. At the end of the setup stage, the neurons spike at the desired stochastic rates.

In some embodiments, the corelet is connected to other corelets through connectors that in some embodiments are set as external connectors. The first input is the data encoded using rate code. The second input interface is the reset signals for the cores in the corelet, which are used to reset the neuron potentials.

An interface may be used to reset the status of the corelet, which is in some embodiments is performed at the beginning of each frame (e.g., an image). Each reset pin is connected to an axon in each corelet defined as a reset axon, which implies that it has to be reserved to reset the neurons after each frame. Even though the reset pin can be used as well to reset the corelet if needed.

Table 3 shows the input parameters for an exemplary corelet with a description and example values.

TABLE 3

| Item Name | Item Description | Example Value |
|---|---|---|
| nInputRows | Number of input Rows | 2 |
| nInputCols | Number of input Columns | 3 |
| nInputChs | Number of input Channels | 2 |
| inCoord | Output pin configuration for each copy. | See below |
| nCopies | Number of copies | |
| nInputTicks | Number of ticks used to input data. Min value: 1. The output latency is (nInputTicks-1). | 4 |
| nAxonPerProb | Number of axons that are used to setup the values for each probability. | 5 |
| axonWeights | A vector with length of nAxonPerProb. At most 3 axon types can be used because 1 type is reserved for reset. | [1, 1, 2, 2, 4] |
| dynamicRange | Value Range: (2, 4, 8, 16, 32, 64,128). Define the needed dynamic range of input values. Default value: 16. An error is generated if it is not possible to achieve the desired dynamic range using the prescribed code (weights and nInputTicks). | 16 |
| maxSpikesPerTick | Define the maximum input Spikes per tick | 1000 |

An exemplary corelet is based on a stochastic Pure Integrator neuron. All neurons in the corelet are set the same way. The neuron is set with threshold=1 and TM according to the required dynamicRange. The neuron is set with gamma=2 (does not reset after spiking), epsilon=0, kappa=1 and beta=0.

During reset period spikes are sent to axon 0 with synaptic weight −255. This causes the neuron to drop its potential to zero. The input data are provided in weighted population code over a group of nAxonPerProb axons per input, with weights defined by the axonWeights vector. These spikes set the membrane potential to some value value, v. The neuron starts spontaneous spiking at a probability of p=v/2™. The neuron continues to spike spontaneously until reset spikes reduce its membrane potential back to zero.

In some embodiments, there is one neuron per output pin. However, a group of input axon may be used to setup one or more neurons to the same value v, depending on the number of copies needed for that input.

Figure 5:
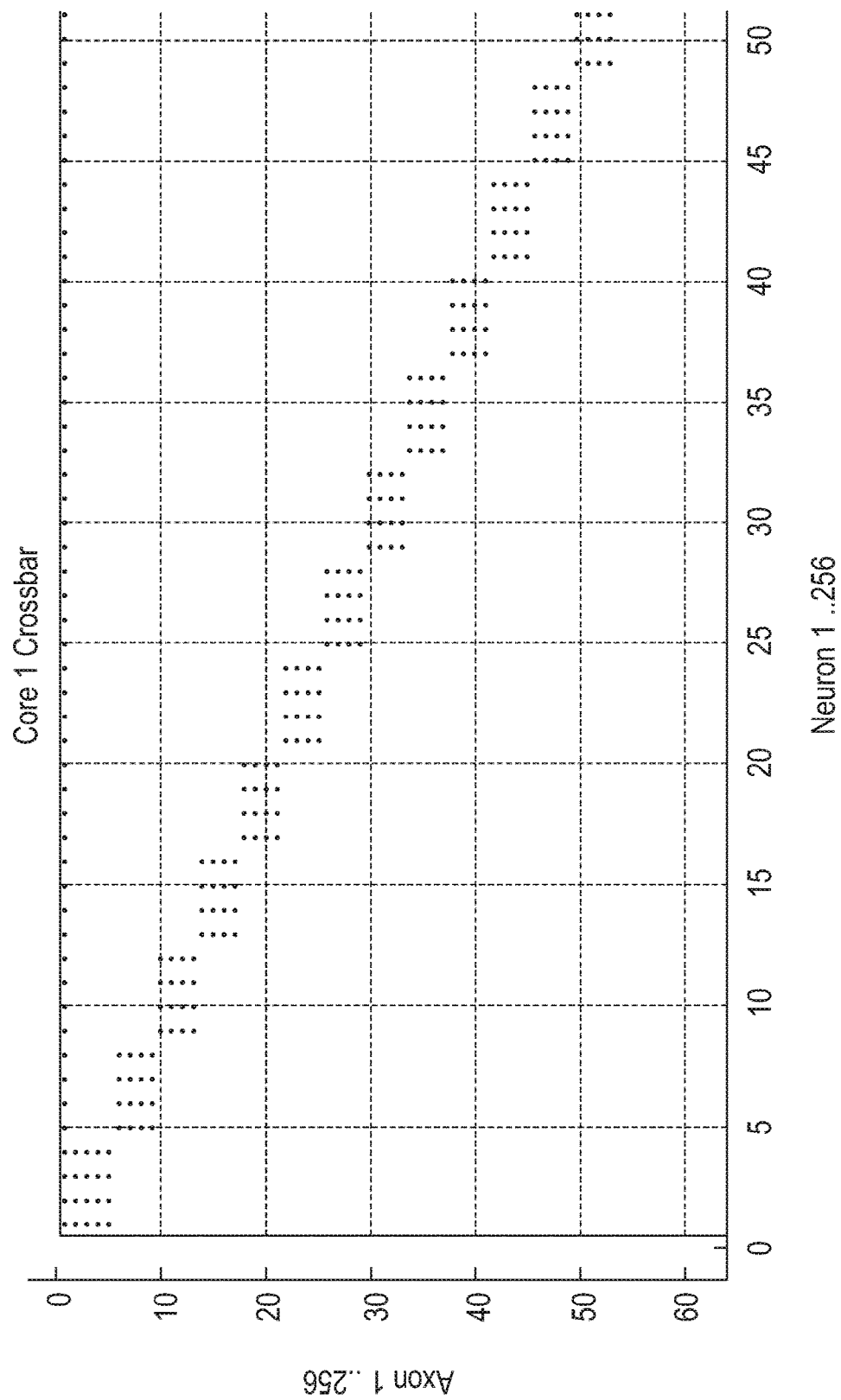
FIG. 5 depicts an exemplary crossbar according to embodiments of the present disclosure.
Figure 6:
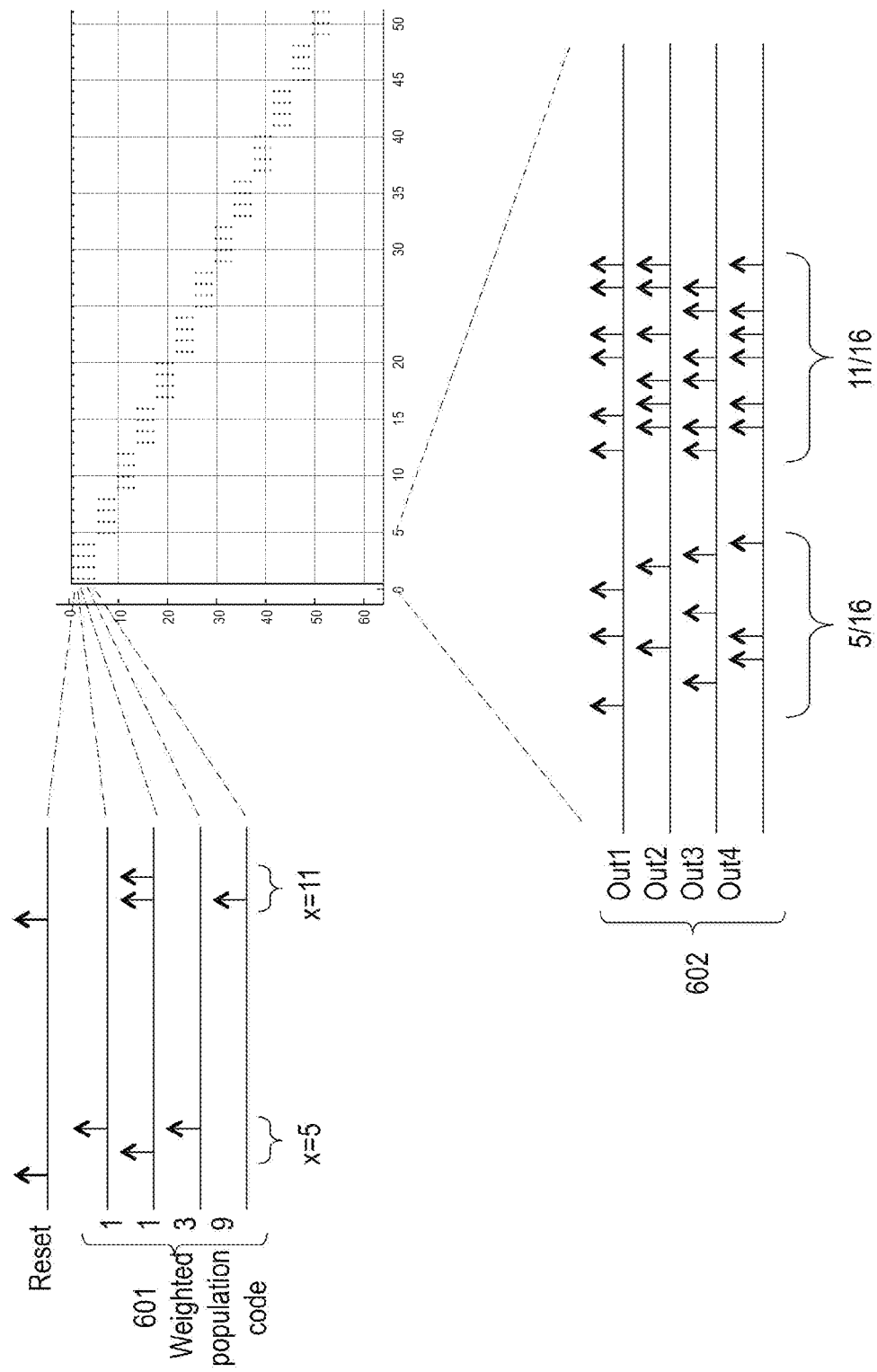
FIG. 6 depicts exemplary input and output of a neuromorphic system according to embodiments of the present disclosure.

Referring to FIG. 5, an exemplary crossbar 501 is illustrated for a case with four input axons and four output copies per pixel. The assigned weights are [1,1,3,9]. Referring to FIG. 6, exemplary input and output for this exemplary crossbar are provided. Inputs 601 are provided in weighted population code. Outputs 602 include four output copies as described further above.

In some embodiments, such as those built on TrueNorth, the rate at which data can be sent to the chip is 1000 spikes per second. In some embodiments, the corelet performs a verification step in which the corelet iterates over all possible examples in the data set to find the maximum number of spikes per tick. If it is bigger than maxSpikesPerTick, the corelet will generate an error message.

If it is not possible to access the data, the corelet can calculate the average spikes according to the pdf (probability density function) of input data and simulate the maximum spikes. Following the transduction example below, the average number of spikes is provided by Equation 3, where $p_i$ is the probability for each input i. In this example, an even distribution may be assumed, $p_i=1/17$. $Spike_i$ is the number of spikes needed to encode input value i. In this example, 17 possible input values are assumed, from 0 to 16.

$$avgSpikes = \sum_{i=0}^{Ninput} p_i * Spike_i \quad \text{Equation 3}$$

With nInputTicks, it is possible to allocate spikes equally to each input ticks. Consider the input data size N (for example 28*28=784), the average spikes in each input tick is given by Equation 4.

$$avgSpikesPerTick = \frac{N}{nInputTicks} \sum_{i=0}^{16} p_i * Spike_i \quad \text{Equation 4}$$

In this example, avgSpikesPerTick=922.35, which can be rounded to 923 as an upper bound.

Although nAxonPerProb and axonWeight can be manually set by the user, the corelet can smartly choose the optimal value, which can have the best accuracy and least number of spikes per tick, as well as cores. generateOptimalPara.m is used to generate the optimized set of parameters. resetDelay is not a configurable parameter for the corelet but it is used to define when to start the effective input after reset. In some embodiments of the underlying chip, the minimum value is 2 to make sure that reset is complete. If a higher dynamic range is needed, it is possible to use 2 ticks to generate a larger negative value to trigger the reset.

The number of output pins is predetermined by the inCoord parameter in the TEA configuration while the number of output pins needs to be calculated for the Variable Length Splitter configuration based on the splitCount vector.

In the TEA configuration there may be as many output connectors as number of copies specified in nCopies. This means that each TEA instance will connect to each one of the output connectors of this corelet. There is only one output connector in the VLS case.

In some embodiments, the corelet has two configurations. The first one has been prepared to provide copies to TEA layer instances. The second one, named Variable Length Splitter (VLS) corelet, provides the functionality of a splitter corelet but with a more flexible definition. The following two sections present the parameters needed to set up the corelet in either one of these formats.

Table 4 shows an example inCoord definition for an image. The image is assumed to be traversed using raster scan, one channel after another. The index of the table indicates pin number in the output connector. In this case, each copy generated by the corelet will follow the inCoord table definition to provide the copies.

TABLE 4

| Output pin (index) | Row | Col | Channel |
|---|---|---|---|
| 1 | 1 | 1 | 1 |
| 2 | 2 | 1 | 1 |
| 3 | 1 | 2 | 1 |
| 4 | 2 | 2 | 1 |
| 5 | 1 | 2 | 1 |
| 6 | 2 | 2 | 1 |
| 7 | 1 | 3 | 1 |
| 8 | 2 | 3 | 1 |
| 9 | 1 | 1 | 2 |
| 10 | 2 | 1 | 2 |
| 11 | 1 | 2 | 2 |
| 12 | 2 | 2 | 2 |
| 13 | 1 | 2 | 2 |
| 14 | 2 | 2 | 2 |
| 15 | 1 | 3 | 2 |
| 16 | 2 | 3 | 2 |

Table 5 shows exemplary input parameters for the VLS configuration.

TABLE 5

| Item No | Item Name | Item Description | Example Value |
|---|---|---|---|
| 1 | splitCount | The number of copies for each input pin is provided as a vector in which the index is the input pin number and the value is the number of copies (which can be zero). | [2, 3, 1, 0, 3, 4, 1, 7, 1] |
| 2 | nInputTicks | Number of ticks used to input data. Min value: 1. The output latency is (nInputTicks-1). | 4 |
| 3 | nAxonPerProb | Number of axons that are used to setup the values for each probability. | 5 |
| 4 | axonWeights | A vector with length of nAxonPerProb. At most 3 axon types can be used because 1 type is reserved for reset. | [1, 1, 2, 2, 4] |
| 5 | dynamicRange | Value Range: (2, 4, 8, 16, 32, 64, 128). Define the needed input dynamic range. Default value: 16. A error is generated it is not possible to achieve the desired dynamic range. | 16 |
| 6 | maxSpikesPerTick | Define the maximum input Spikes per tick | 1000 |

As an example vector of splitCount, the order of the input pin is decided by the index of splitCount. The order of the output pin will be incremented according to the number copies needed for each input pin as specified in the vector. In this example, the input pin number 1 will be copied two times in the output connector while the input pin number 4 will not be copied since its value in the vector is zero.

The data is entered to the corelet using stochastic rate code, as defined in the input parameters. The pin distribution and the number of input pins are derived from the input parameters as specified in the input parameter section. generateDataSpikes.m is used to generate the spikes for data.

In some embodiments, as discussed above, data is converted to spikes using TrueNorth tools such as tn-signal-processor. In exemplary embodiments, a transducer is provided. Given the configuration of the corelet, it transduces a set of images into spikes, identifying the optimal configuration as shown below.

Assuming the following parameters—axonWeight: [1,3, 9]; Input range: 16 (input data will be converted to an integer from 0 to 16); nInputTicks: 2. The corelet generates a look up table to transduce the input data, as shown in Table 6.

TABLE 6

| Input | Spikes Needed |
|---|---|
| 0 | Null |
| 1 | 1 (1 spike for Axon Type 1) |
| 2 | 2 (2 spikes for Axon Type 1) |
| 3 | 1 (1 spike for Axon Type 2) |
| 4 | 2 (1 spike for Axon Type 1, 1 for 2) |
| 5 | 3 (2 spike for Axon Type 1, 1 for 2) |
| 6 | 2 (2 spike for Axon Type 2) |
| 7 | 3 (1 spike for Axon Type 1, 2 for 2) |
| 8 | 4 (2 spikes for Axon Type 1, 2 for 2) |
| 9 | 1 (1 spike for Axon Type 3) |
| 10 | 2 (1 spike for Axon Type 1, 1 for 3) |
| 11 | 3 (2 spike for Axon Type 1, 1 for 3) |
| 12 | 2 (1 spike for Axon Type 2, 1 for 3) |
| 13 | 3 (1 spike for Axon Type 1, 1 for 2, 1 for 3) |
| 14 | 4 (2 spike for Axon Type 1, 1 for 2, 1 for 3) |
| 15 | 3 (2 spike for Axon Type 2, 1 for 3) |
| 16 | 4 (1 spike for Axon Type 1, 2 for 2, 1 for 3) |

Figure 7:
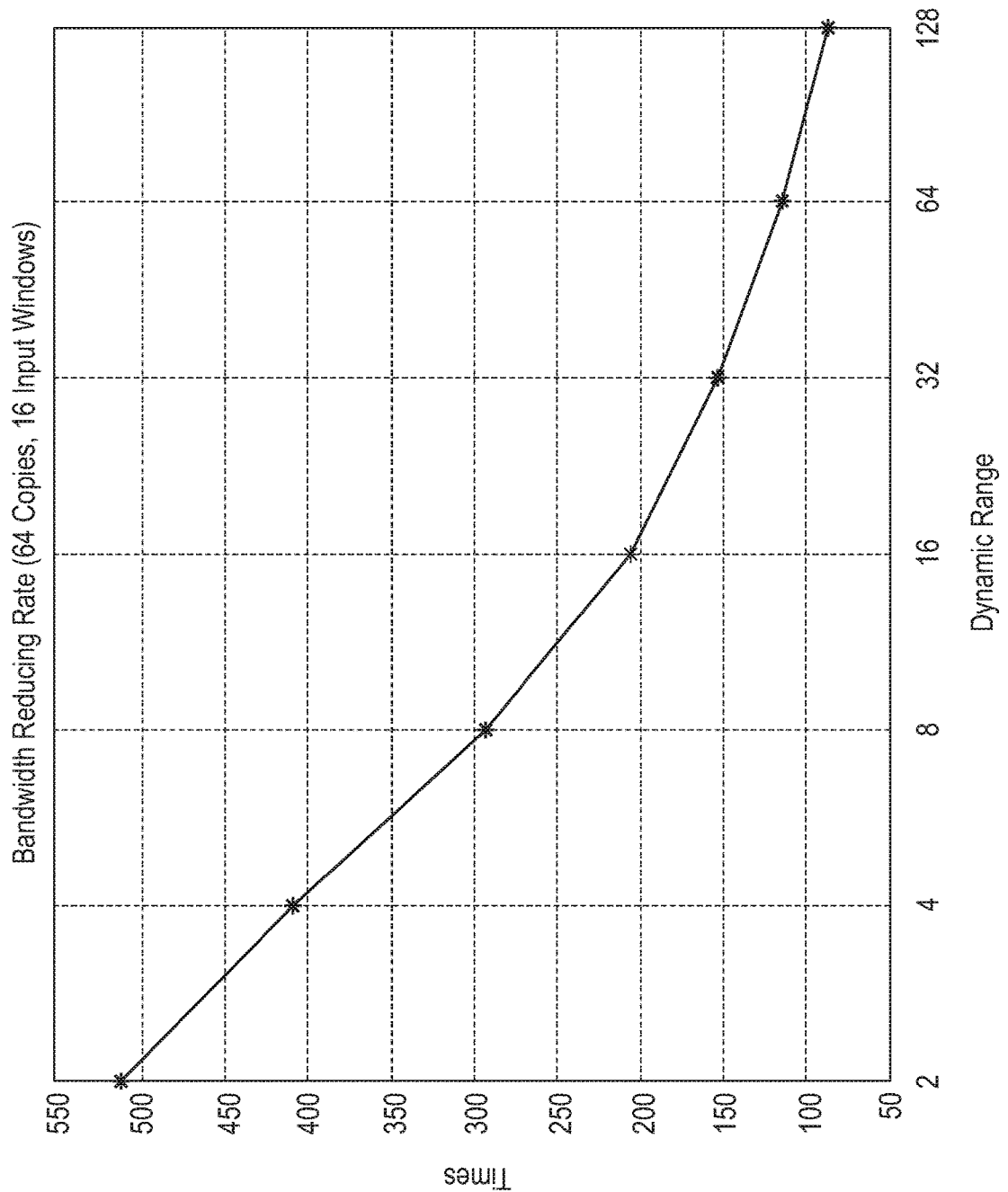
FIG. 7 illustrates bandwidth reduction according to embodiments of the present disclosure.

The bandwidth reduction rate will change according to needed copies and needed input time window (using multiple ticks to represent the input data). FIG. 7 shows the improvement under different configuration if the input data is uniformly distributed between 0 to 1, 64 copies and 16 input time windows are needed. Dynamic Range is the accuracy to represent a float point number, e.g., 128 means it will use fixed number from 0~128 to represent float number 0~1. The higher Dynamic Range, more accurate and more input spikes needed as well.

Figure 8:
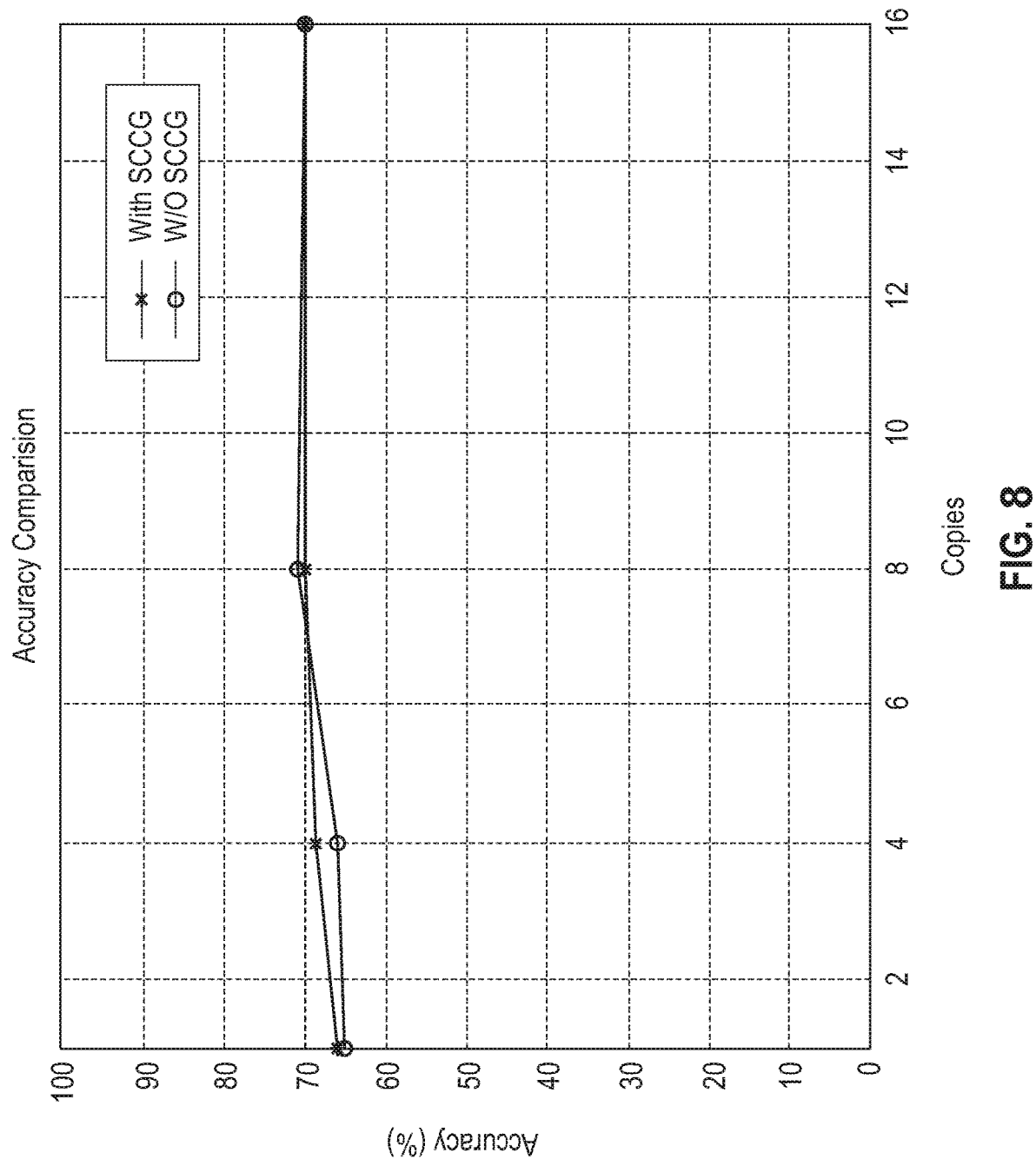
FIG. 8 illustrates system accuracy according to embodiments of the present disclosure.

Corelets according to the present disclosure support different accuracy, input/output time windows, and copy counts. With appropriate configuration, it achieves the same system performance with least bandwidth requirements. FIG. 8 shows the comparison with and without the corelet in image classification.

It will be appreciated that embodiments of the present disclosure are suitable for application in various neuromorphic systems. Although the present disclosure presents various exemplary embodiments in terms of a IBM TrueNorth implementation, its teachings are applicable to other non-von Neumann architectures. In various such architectures, the neuromorphic substrate may be built on VLSI technology, using electro-magnetic components, memristors, capacitor-based systems, analog devices, or other neuromorphic devices. Some such architectures provide programmable systems, while others provide dedicated systems. Some such architectures provide learning on chip, while some provide learning off-chip. Some such architectures are deployed on a single chip, while other are deployed on multiple chips such as in arrays or in multi-layer neuromorphic architectures. Some such architectures are based on packet-based spikes, while others are based on a variety of other electronic signals.

By way of example, a neurosynaptic program may represents a neurosynaptic network. A neurosynaptic program includes information relating to a neurosynaptic network. The information includes neuronal properties and dynamics that determine an electronic neuron's response to input spikes. For example, neuronal properties and dynamics can include a threshold parameter, a leak parameter, a delay parameter, or a reset parameter. The neurosynaptic program may information includes synaptic connections of the neuron (e.g., synaptic connections made via a synaptic crossbar. The neurosynaptic program information may include axon properties (e.g., axon types). The neurosynaptic program information may include one or more destinations (e.g., target axons) that the neuron's output spike should be delivered to.

A neurosynaptic network represents an instantiation of a neurosynaptic program. A neurosynaptic network may be instantiated in hardware, in simulation or in both. For example, a neurosynaptic program may give rise to one or more instances of a neurosynaptic network, wherein the instances may reside on a single core, multiple cores, or multiple chips.

A neuromorphic core circuit represents an example neurosynaptic network described by a neurosynaptic program.

A corelet or a Corelet Programming Language may represent software that provide abstraction of neurosynaptic programs. A composition of neurosynaptic programs may be created by composing corelets.

In a network of neurosynaptic cores, neurons on each core can connect to any axon of any other neurosynaptic core (including itself). When a neuron spikes, it sends a spike packet that gets delivered to a target axon on a destination core. Given an application and configured neurosynaptic a virtual graph G can be constructed, where every node represents a single core and every edge represents a connection from a set of source neurons on a source core, to a set of destination axons on a target core. The weight of the edge between any two cores represents the total number of spikes communicated between the two cores. Any self-edges (between a neuron and axon on the same core) may be ignored. In a physical hardware embodiment of a neurosynaptic system, each core may have a unique physical address in a 2D grid on a chip. There can be any number of chips in a system.

A spike communication from a source neuron on a source core, to a target axon on a destination core, may traverse certain number of hops via routers in a 2D grid in either the horizontal or vertical or a combination of both to be delivered to the target axon on a destination core. Each hop a spike packet traverses, consumes power and energy.

Figure 9:
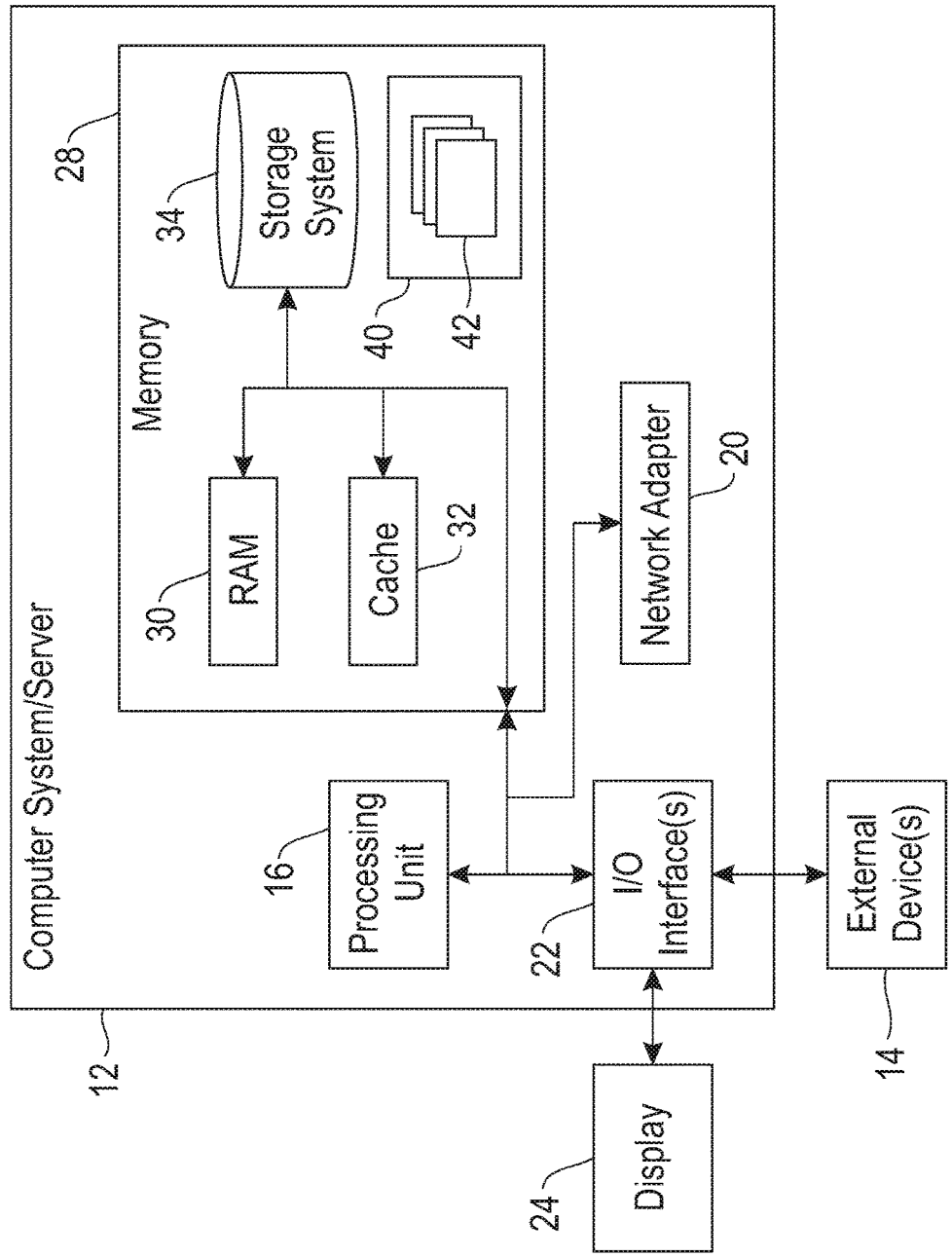
FIG. 9 depicts a computing node according to an embodiment of the present disclosure.

Referring now to FIG. 9, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   receiving a plurality of input values;
   for each of the plurality of values, generating a plurality of spikes, each of the plurality of spikes having an associated weight, wherein each of the associated weights is selected from a predetermined set of weights, wherein the set of weights is determined based on a range of the plurality of input values, wherein the set of weights is determined to minimize a cardinality of the plurality of spikes for those of the plurality of values within a predetermined range;
   determining a consumption time for each of the plurality of spikes;
   sending each of the plurality of spikes for consumption at its consumption time.

2. The method of claim 1, wherein the consumption time for each of the plurality of spikes is selected from a predetermined set of consumption times.

3. The method of claim 1, wherein sending each of the plurality of spikes comprises sending a delay instruction corresponding to its consumption time.

4. The method of claim 1, wherein the consumption time of the plurality of spikes is within a predetermined setup period.

5. A method comprising:
   receiving at a first neuromorphic system a first plurality of spikes, the first plurality of spikes encoding a first value according to a first encoding, wherein the first encoding associates a weight with each of the first plurality of spikes, wherein the weights of the first plurality of spikes are determined to minimize a cardinality of the first plurality of spikes for those of a plurality of values within a predetermined range;
   generating from the first plurality of spikes a second plurality of spikes, the second plurality of spikes encoding the first value according to a second encoding;
   providing the second plurality of spikes to a second neuromorphic system.

6. The method of claim 5, further comprising:
   receiving at the first neuromorphic system a plurality of delays, each of the plurality of delays associated with one of the first plurality of spikes;
   delaying each of the first plurality of spikes by its associated delay.

7. The method of claim 5, wherein receiving the first plurality of spikes comprises:
   receiving a first subset of the first plurality of spikes during a first time window;
   receiving a second subset of the first plurality of spikes during a second time window.

8. The method of claim 5, wherein generating the second plurality of spikes comprises:
   applying the weights of the first encoding to the first plurality of spikes.

9. The method of claim 5, wherein each of the first plurality of spikes is received in one of a predetermined number of time windows.

10. The method of claim 5, wherein each of the plurality of spikes represents a discrete value.

11. The method of claim 5, wherein generating the second plurality of spikes comprises:
    determining a probability from the weights of the first encoding and the first plurality of spikes.

12. The method of claim 5, further comprising:
    providing output to the second neuromorphic system, and concurrently therewith, receiving at the first neuromorphic system a third plurality of spikes, the third plurality of spikes encoding a second value according to the first encoding.

13. The method of claim 5, further comprising:
    receiving at the first neuromorphic system a third plurality of spikes, the third plurality of spikes encoding the difference between a second value and the first value according to the first encoding;
    generating from the third plurality of spikes a fourth plurality of spikes, the fourth plurality of spikes encoding the second value according to the second encoding;
    providing the fourth plurality of spikes to the second neuromorphic system.

14. The method of claim 5, wherein the second neuromorphic system comprises a classifier.

15. A method comprising:
- receiving at a neuromorphic system a first plurality of spikes, the first plurality of spikes encoding a first value according to a first encoding, wherein the first encoding associates a weight with each of the first plurality of spikes, wherein the weights of the first plurality of spikes are determined to minimize a cardinality of the first plurality of spikes for those of a plurality of values within a predetermined range;
- generating from the first plurality of spikes a plurality of sets of spikes, each of the plurality of sets of spikes encoding the first value according to a second encoding;
- providing each of the plurality of sets of spikes to one of a plurality of classifiers in the neuromorphic system.

16. A system comprising:
- a neuromorphic network comprising a plurality of input axons, and a plurality of stochastic neurons connected thereto;
- an encoder operatively coupled to the plurality of input axons, the encoder configured to send to the input axons a first plurality of spikes, the first plurality of spikes encoding a first value according to a first encoding, wherein the first encoding associates a weight with each of the first plurality of spikes, wherein the weights of the first plurality of spikes are determined to minimize a cardinality of the first plurality of spikes for those of a plurality of values within a predetermined range;
- the neuromorphic network configured to generate from the first plurality of spikes a second plurality of spikes, the second plurality of spikes encoding the first value according to a second encoding.

17. The method of claim 15, further comprising:
- receiving at the first neuromorphic system a plurality of delays, each of the plurality of delays associated with one of the first plurality of spikes;
- delaying each of the first plurality of spikes by its associated delay.

18. The method of claim 15, wherein receiving the first plurality of spikes comprises:
- receiving a first subset of the first plurality of spikes during a first time window;
- receiving a second subset of the first plurality of spikes during a second time window.

19. The method of claim 15, wherein generating the plurality of sets of spikes comprises:
- applying the weights of the first encoding to the first plurality of spikes.

20. The method of claim 15, wherein generating the plurality of sets of spikes comprises:
- determining a probability from the weights of the first encoding and the first plurality of spikes.

* * * * *